United States Patent [19]
Morstein et al.

[11] Patent Number: 5,836,002
[45] Date of Patent: Nov. 10, 1998

[54] ANTI-THEFT DEVICE

[76] Inventors: Jason Morstein, 9453 Keepsake Way, Columbia, Md. 21046; Rhonda Morstein, 633 SE. Walnut St., Hillsboro, Oreg. 97123; Jerome Morstein, 9453 Keepsake Way, Columbia, Md. 21044; Jerome Daly, 19016 South Augusta Dr., Baton Rouge, La. 70810

[21] Appl. No.: 457,043

[22] Filed: Jun. 1, 1995

[51] Int. Cl.$^6$ .................................................. G08B 13/14
[52] U.S. Cl. .................... 340/568; 340/427; 340/571; 340/432
[58] Field of Search .................... 340/568, 571, 340/426, 427, 542, 693, 432; 70/233, 234

[56] References Cited

U.S. PATENT DOCUMENTS

| | | | |
|---|---|---|---|
| 3,772,645 | 11/1973 | Odenz et al. | 340/571 |
| 3,781,861 | 12/1973 | Adler, Jr. et al. | 340/427 |
| 3,824,540 | 7/1974 | Smith, III | 340/427 |
| 5,194,845 | 3/1993 | Sirmon et al. | 340/427 |
| 5,408,212 | 4/1995 | Meyers et al. | 340/427 |
| 5,408,213 | 4/1995 | Ungarsohn | 340/427 |
| 5,534,847 | 7/1996 | McGregor | 340/432 |

*Primary Examiner*—Jeffrey Hofsass
*Assistant Examiner*—Benjamin C. Lee
*Attorney, Agent, or Firm*—Stephen C. Wieder

[57] ABSTRACT

An anti-theft device for protecting objects and vehicles, includes a housing that is attachable to or permanently affixed to an object or vehicle to be secured, wherein the attachment means is accessible only through a lockable access door of the housing. A flexible conducting securing cable serves as a conductor in an alarm circuit and has one end fixed to the housing and a free end provided with a fitting for insertion into the housing that is retained by a retainer and a lock mechanism in the housing. First and second switches are provided in the alarm circuit wherein the first switch is normally open and is closed when the housing is attached to the object, while the second switch is normally open and is closed when the free end of the cable is inserted into the retainer. The alarm circuit is armed when both the first and second switches are closed, and subsequent opening of the first switch or tampering of the conduction path formed by the conducting securing cable activates an alarm.

3 Claims, 5 Drawing Sheets

ANTI-THEFT DEVICE

FIELD OF THE INVENTION

This invention relates to an anti-theft device for objects and vehicles.

BACKGROUND OF THE INVENTION

Numerous attempts have been made to find a satisfactory solution to the problem of providing an anti-theft device for objects and vehicles. Some prior attempts have provided a locking device such as locks and chains that can be selectively attached to an object or vehicle to enable it to be locked to a rigid or fixed structure such as a pole, bike rack or other structure. Most locks or chains can be easily cut. Recognizing this, attempts have been made to provide an alarm to detect if a chain has been cut. Many prior art anti-theft devices are portable so they can be carried around and selectively secured to a desired object or vehicle when desired. Other attempts to provide alarm-type anti-theft systems have also been made. Various drawbacks exist with previously known anti-theft devices.

SUMMARY OF THE INVENTION

According to one embodiment, the present invention includes a housing, that is attachable to or permanently affixed to an object or vehicle to be secured. Preferably, the housing is attached or affixed through a mechanism located at least partially within the interior of the housing, and which is accessible through a lockable access door of the housing. A battery operated alarm circuit is also provided. A flexible securing cable, preferably a vinyl coated stainless steel wire rope, which serves as a conductor in the alarm circuit, has one end fixed to the alarm housing and has a free end. The free end is provided with a fitting adapted to be inserted into the housing and retained by a retainer and a lock mechanism. The lock mechanism is an integral or unitary component of the housing and is operable in a plurality of positions to serve a dual function. The lock mechanism serves to lock the access door and to lock or unlock the free end of the cable with respect to the retainer. According to a preferred embodiment, first and second switches are provided in the alarm circuit. The first switch is normally open and is closed when the housing is attached to the object. The second switch is normally open and is closed when the free end of the cable is inserted into the retainer. The alarm circuit is activated or armed when the free end of the securing cable is inserted into the retainer, provided the first switch has already been closed. When not in use, the cable can be stored, preferably, by manually wrapping the cable around the housing and inserting the fitting into a clip attached to or formed from the housing, or by a retractable mechanism in the housing.

Preferably, the alarm circuit may provide an audible or visual indication of when the alarm is activated and may be designed to emit various other messages.

DETAILED DESCRIPTION OF THE PREFERRED EMBODIMENTS

For purposes of simplicity, the invention will be described in connection with an anti-theft device for a bicycle. It is to be understood, however, that the invention may be used with many other objects or vehicles. Additionally, the housing may be designed to be attached to or fixed to any convenient portion of the bicycle or object. For purposes of simplicity, the invention will be described in connection with attachment to the bicycle frame stem. When used with a bicycle, however, the invention is not so limited.

Figure 1:
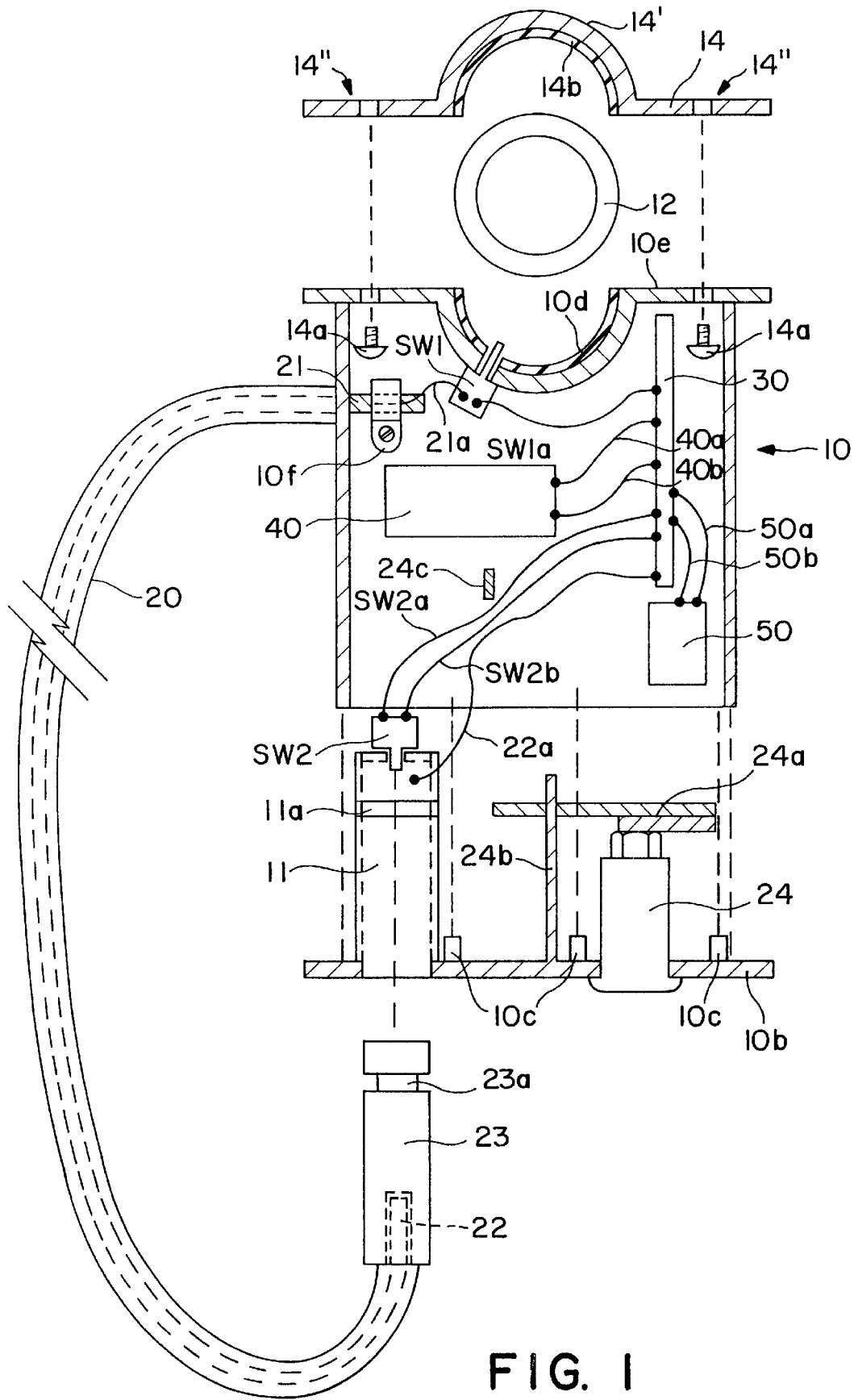
FIG. 1 is a schematic illustration of the anti-theft system according to one aspect of the present invention.

FIG. 1 illustrates a top sectional view of one preferred embodiment of the present invention. FIG. 1 illustrates a housing, generally indicated 10, attached to a bicycle frame stem 12 by an attachment mechanism 14, in cooperation with a portion of the housing 10 and fasteners 14a. Preferably, attachment mechanism 14 is a rigid member, a portion of which defines a mating surface (14') that substantially conforms to a mounting surface of the object to be secured with a mounting surface of the object to be secured. For example as shown, the mating surface 14' is shaped or formed to match the diameter of frame stem 12. The attachment mechanism also comprises a portion or portions 14" that enable attachment to the housing 10. For example, the attachment mechanism 14 may be attached to a closure plate 10e of the housing 10 by use of fasteners 14a from within the housing 10. Preferably, at least a portion of the attachment mechanism or fastener is located within the housing 10 to prevent unauthorized access thereto.

Housing closure plate 10e is also preferably formed or shaped to match the diameter of bicycle frame stem 12 (or otherwise substantially conforms to a mounting surface of the object to be secured). The housing closure plate 10e is fixed to and forms a wall of the housing 10 to help prevent unauthorized access to the interior of the housing 10. Preferably, a mating surface of both closure plate 10e and attachment mechanism 14 are lined with a gasket 14b and 10d, respectively to facilitate a tight and secure fit therewith.

A cable 20 comprising an electrical conductor surrounded by an electrical insulator has a first end 21 and a second end 22 The first end 21 comprises an uninsulated length of electrical conductor and is fixed to the housing 10 by a non-conductive retainer clip 10f which is mechanically attached to housing 10 (in any known manner) and retains the uninsulated length of the free end 21 of cable 20 in a position to cause it to be in electrical contact with an uninsulated first end of wire 21a. A second end of wire 21a is connected to a terminal of switch SW1. Second end 22 of cable 20 comprises an uninsulated length of electrical conductor and is provided with a retainer 23 that is attachable to the housing 10 via sleeve 11 fixed into the housing. For convenience, the first end 21 will be referred to as the fixed end and the second end 22 will be referred to as the free end, with the understanding that the "free end" is attachable to the housing and is intended to be so attached in use as described below.

Externally of the housing 10, cable 20 provides a continuous electrical path between the fixed end 21 and the free end 22. Within the housing, the fixed end 21 is connected to the free end 22 by a suitable conductor path, preferably via conductor 21a, switch SW1, wire SW1a, printed circuit board 30, wires SW2a and SW2b, switch SW2, and/or wire 22a. For example, fixed end 21 may be connected to wire 21a, which in turn is connected to a terminal of switch SW1. The other terminal of switch SW1 is connected to a terminal of the printed circuitboard 30 by wire SW1a. The free end 22 is connected to electrically conducting retainer 23, which in turn is in contact with wire 22a when the free end 22 is attached to the housing 10. Preferably, sleeve 11 is not electrically conductive. Wire 22a is also attached to a terminal of printed circuit board 30.

First switch SW1 is normally open, but is operatively positioned with respect to housing 10 to cause switch SW1 to be closed when, and so long as, the housing is attached to the bicycle frame stem 12 (or other object to be secured). This may be accomplished by providing a plunger mechanism on the switch that protrudes into the mating surface area of housing 10 to cause depression of the plunger when the housing is attached to an object, whereby depression of the plunger causes switch SW1 to close. The Switch SW1 preferably is connected to conductors 21a and SW1a which in turn are connected, respectively, to the fixed end 21 and a terminal of circuit board 30.

A second switch SW2 is normally open and is operatively positioned with respect to housing 10 to be closed when, and so long as, the free end 22 is operatively positioned in housing 10. This may be accomplished by providing a retainer 23 on the free end 23 and a sleeve 11 within the housing and providing switch SW2 with a plunger that is operatively positioned (as shown) to be depressed when the retainer is inserted into the sleeve 11, whereby depression of the plunger causes switch SW2 to close. Switch SW2 preferably is connected to a pair of conductors SW2a and SW2b which in turn are each connected to a terminal of the circuit board 30.

A battery 40 (or other suitable power source) is operatively positioned within the housing 10 and connected to circuit board 30 by conductors 40a and 40b to enable operation of the alarm circuit. A piezo-electric audio device (or other audible indicator) 50 is operatively positioned in the housing 10 and is connected to terminals of printed circuitboard 30 by conductors 50a and 50b. Housing 10 includes suitable apertures to allow an audible signal created by the audible indicator 50 to effectively emanate from the interior of the housing 10. The audible indicator may be mounted in housing 10 in a manner suitable to maximize its audible discharge.

Figure 1A:
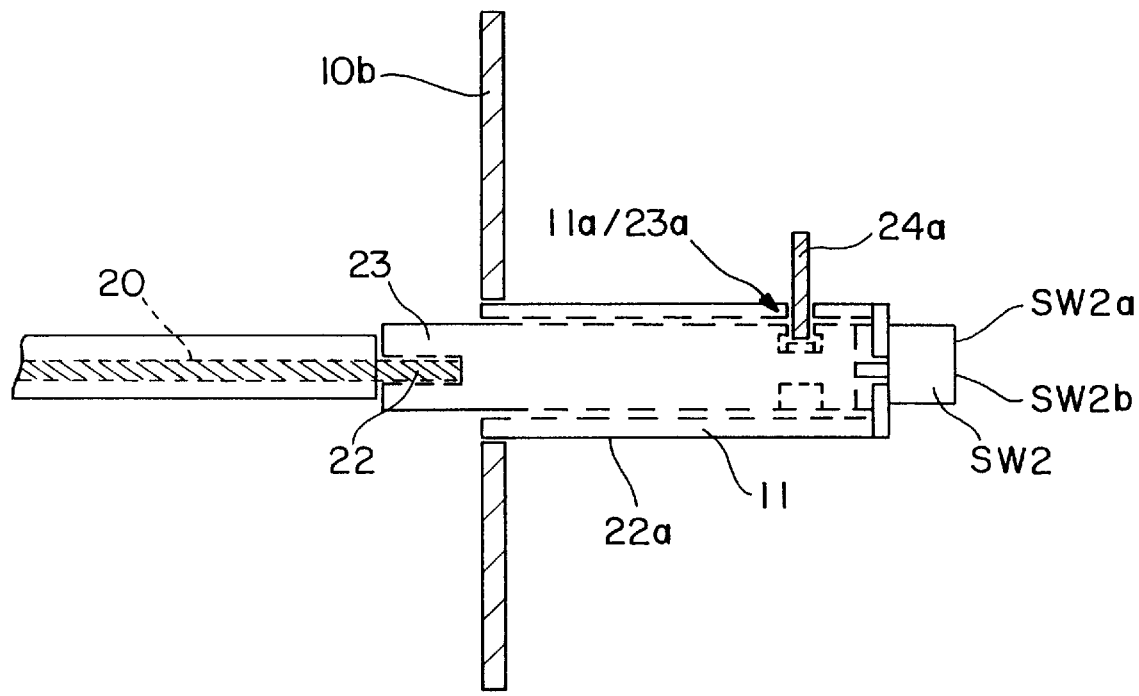
FIG. 1A, 1B, 1C and 1D are partial schematic illustrations of one aspect of the present invention.
Figure 1B:
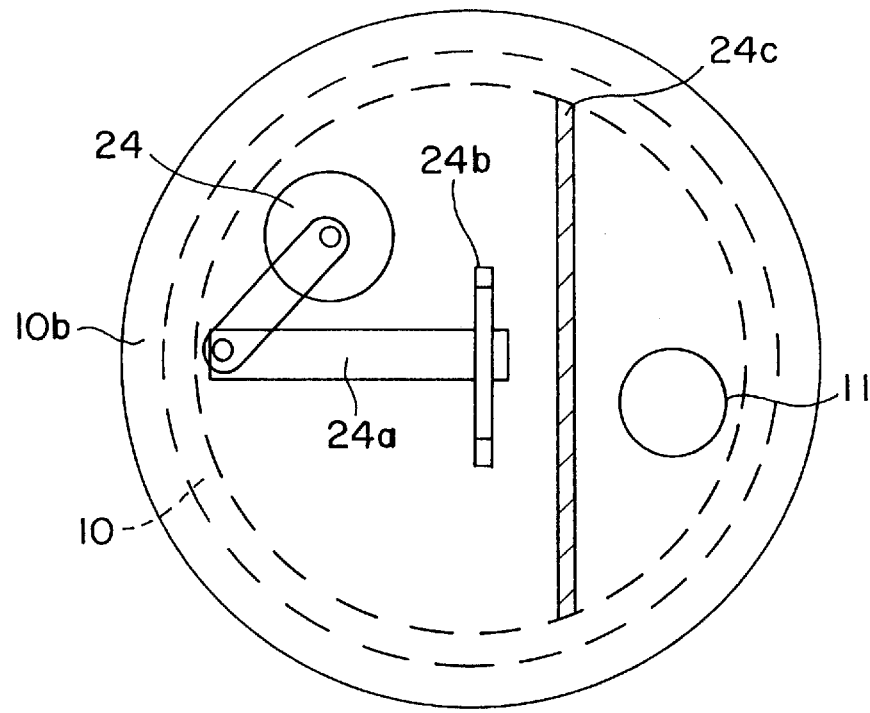
Figure 1C:
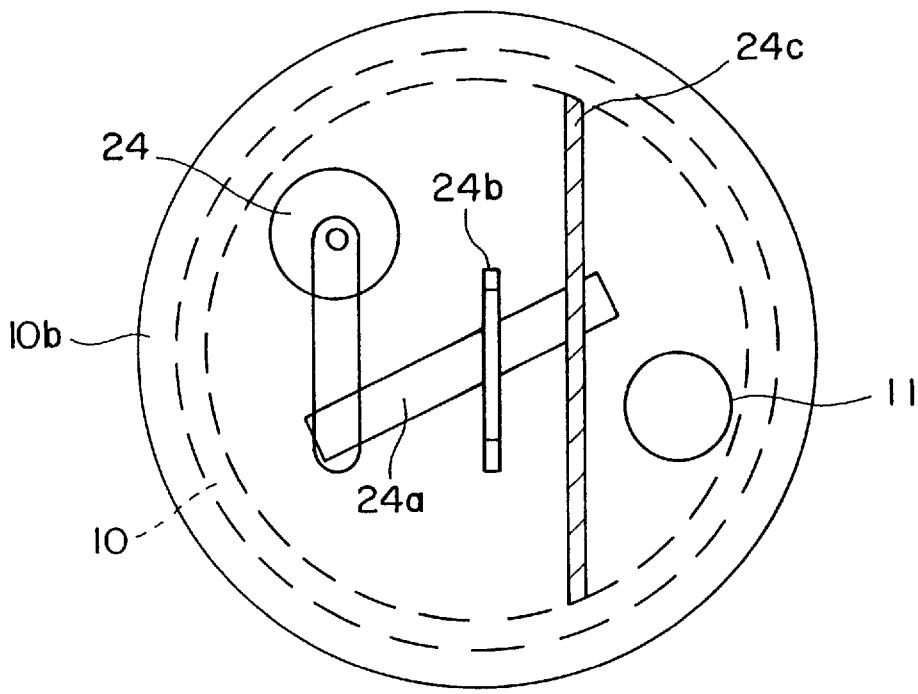

As shown in FIGS. 1 and 1a, the free end 22 is adapted to be provided with a retainer 23 that is permanently attached to the stainless steel wire rope (or other electrical conductor) within cable 20 at its free end. The retainer 23 is designed to be inserted into a sleeve 11 and has a slot 23a formed near an end thereof. Sleeve 11 is formed with a slot 11a, similar in size and shape to slot 23a, which is positioned in sleeve 11 so that slots 11a and 23a align when fitting 11 is fully inserted into sleeve 23.

Figure 1D:
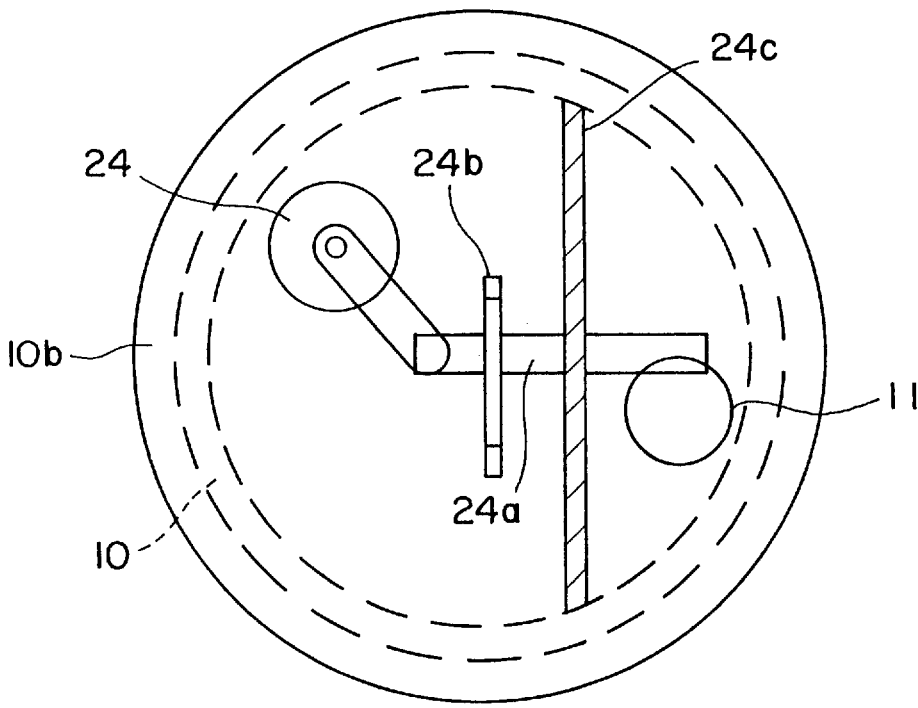

Also provided within housing 10 is a lock mechanism 24 having a rotatable projection 24a that may be selectively extended or retracted to assume a plurality of positions. Preferably, the housing 10 will have an access door 10b to enable access to the interior of the housing to permit operation of the attachment mechanism 14, installation or replacement of the battery 40 or for other desired purposes. For security, the access door 10b is lockable, preferably by the lock mechanism 24 (or by another suitable locking mechanism). Lock mechanism preferably has a portion which protrudes through the access door 10b (or another suitable portion of the housing 10) to enable an authorized user to cause the locking mechanism to assume one of a plurality of states by causing the rotatable projection to assume one of a plurality of positions, as shown in FIGS. 1, 1a, 1b, 1c and 1d. For example, locking mechanism 24 can assume an open state by causing projection 24a to assume a retracted position (FIG. 1b), an unlocked state by causing projection 24a to extend through retainer bar 24c but not engage slots 11a/23a (FIG. 1c) and a locked state by causing projection 24a to extend through retainer bar 24c and engage slots 11a/23a (FIG. 1d). In the open state, the rotatable projection 24a is retracted so that it does not pass through or engage retainer bar 24c, and thereby allows the access door 10b to be released from the housing 10 to permit authorized access to the interior of the housing 10. Rotatable projection 24a is preferably guided into position by guide bar 24b. The access door 10b may positioned in place on housing 10 by alignment pegs 10c or may be pivotally or otherwise attached to the housing 10. In the unlocked state, rotatable projection 24a is retracted from sleeve 11 to allow retainer 23 to be inserted into or removed from sleeve 11, but remains engaged with retainer bar 24c to maintain access door 10b in a locked condition to prevent unauthorized access to the interior of the housing 10. In the locked position, rotatable projection 24a maintains the access door 10b in a locked condition to prevent unauthorized access to the interior of the housing 10 by extending through retainer bar 24c and fixes retainer 23 in sleeve 11, causing the free end 22 to be selectively locked in place inside housing 10 and causes switch SW2 to be simultaneously closed. To accomplish this slots 11a and 23a may sized and aligned to receive rotatable projection 24a when lock mechanism 24 is in the locked position (FIG. 1d). By maintaining the lock mechanism 24 in its locked position, fitting 23 will continue to keep switch SW2 closed.

The closing of switch SW2 allows the battery 40 to energize the alarm circuit. Opening of switch SW2 de-energizes and disarms the alarm circuit. Preferably, upon closing switch SW2, in conjunction with the previous closing of switch SW1, the alarm circuit will be activated, and preferably an instantaneous audible (or visual) indication of confirmation that the alarm circuit is activated will be provided by piezo-electric device 50 or other suitable indicator).

Thus, in a preferred embodiment, the lock mechanism 24 provides the dual function of enabling access to the interior of the housing 10 and selectively securing the free end 22 to the housing 10.

In operation, the lock mechanism 24 is put in an "open" position and access door 10b is removed (or otherwise opened). Then battery 40 is installed and connected to wires 40a and 40b. Next, housing 10 is mounted to the object to be secured, thereby closing normally open switch SW1 and attachment mechanism 14 is secured to housing 10 by screws 14a. The access door is replaced (or closed) and secured by putting the lock mechanism 24 in the "unlocked" position. When desired, retainer 23 is released from the integral retainer clip on access door 10b, and cable 20 is unwound from its storage position around the exterior of housing 10. Cable 20 is wrapped around and/or through a suitable structure. Then, retainer 23 is inserted into sleeve 11, and retained by setting the lock mechanism into the "locked" position. Insertion of retainer 23 into sleeve 11 closes normally open switch SW2 thereby connecting the battery 40 into the alarm circuit and activating the alarm circuit. Confirmation is signalled by an instantaneous activation of the piezo-electric audible device (or other indicator). Once activated, the alarm will remain in this state until lock mechanism 24 is returned to the "unlocked" position and retainer 23 is removed from sleeve 11. While activated, the alarm circuit will initiate a continuous audible signal if the housing is removed from the secured item (this activity is considered unauthorized because the proper method of removing the housing from the secured object requires that lock mechanism 24 be in the "open" position, thereby allowing access door 10b to be removed (or opened) and providing proper access to securing screws 14a). While activated, the alarm circuit will also initiate a continuous audible signal if cable 20 is cut, or the conductor path is otherwise made discontinuous. Once the audible signal is initiated it can not be interrupted or silenced by recreating the continuity of the conductor path due to the SCR in the alarm circuit. The SCR activates the audible alarm when turned on. Reconnecting the continuity of the conductor path will not turn the SCR off.

When so desired, the authorized operator can set lock mechanism 24 in the "unlocked" position, thereby releasing retainer 23 from sleeve 11, and disarming the alarm circuit. Cable 20 is then stowed in position around housing 10, with the free end of cable 20 being retained in place by inserting retainer 23 into the retainer clip, which may be an integral component of access door 10b. The object to be secured can now be transported.

Figure 2:
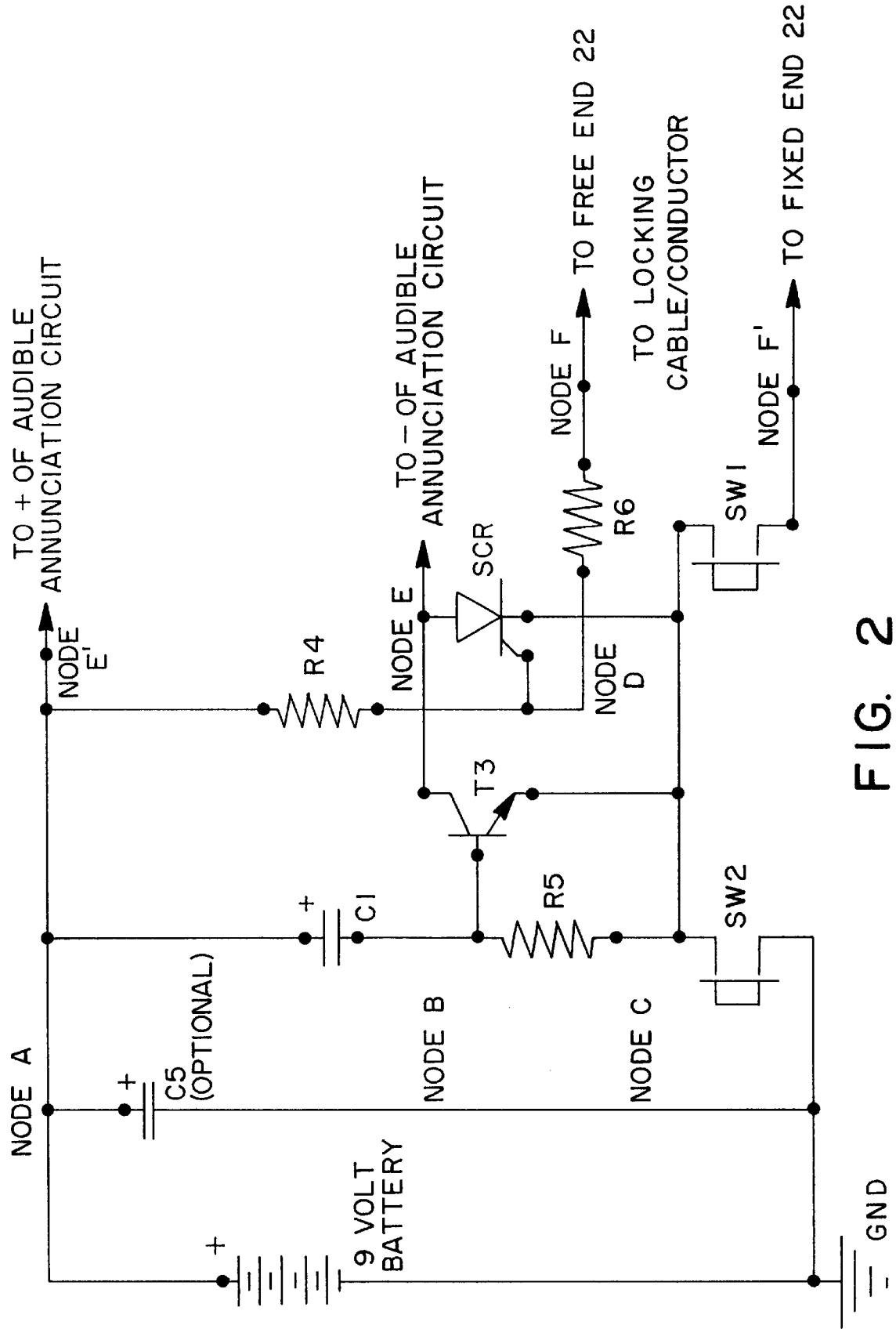
FIG. 2 is a schematic diagram of an alarm circuit for use with the present invention.

With reference to FIG. 2, a more detailed discussion of one embodiment of the alarm circuit will be provided. As shown in FIG. 2, starting at the left most circuit branch, a 9-volt battery is connected between node A and ground. A capacitor C5 may be connected in parallel thereto. Also connected to Node A may be the positive side of capacitor C1. The negative side of capacitor C1 is connected to node B. Connected between node B and node C is a Resistor R5. Connected between node C and ground is Switch SW2. Transistor T3 is connected between nodes B and C as shown Resistor R4 is connected between nodes A and D. An SCR is connected between nodes E, D, and C, as shown. Connected between nodes D and F is Resistor R6. Node F is connected to free end of cable 20. Switch SW1 is connected between node F' and fixed end 22 of cable 20. When the alarm is activated, cable 20 will connect between nodes F and F'. Located between nodes A and E is the audible annunciation circuit (FIG. 3) which serves to activate the piezo device 50 when the invention is in the alarm mode. According to a preferred embodiment, an integrated timer circuit, preferably an MC3456, is also provided and preferably has 14 pins or terminals. Node A is connected to pin 4. Resistor R1 is connected between node A and pin 1. Resistor R9 is connected between pin 1 and one side of C6 and to pin 2, which is also connected to pin 6. Pin 3 is connected to one side of capacitor C2, the other side of which is connected to node E. Pin 5 is connected to one side of resistor R3, the other side of which is connected to node G. Pin 7 is connected to node E. Pin 8 is connected to one side of capacitor C4, the other side of which is connected to node E. Pin 9 is connected to one side of a resistor R7 and to one side of resistor R8. The other side of resistor R7 feeds transistor T1. The other side of resistor R8 feeds transistor T2. The emitter of transistors T1 and T2 are connected to node E. The collectors of transistors T1 and T2 are connected to node H. Pin 10 is connected to node A, and pin 11 is connected to node G. Pin 12 is connected to one side of resistor R10, the other side of which is connected to pin 13. Pin 12 is also connected to pin 8 and capacitor C4. Pin 13 is connected to one side of resistor R10 and is also connected to one side of Resistor R2, the other side of which is connected to node A. Pin 14 is connected to node A. Node A is also connected to one side of a first coil of a transformer (TRANS). The other side of the first coil is connected to node H. The second side of the transformer comprises a second coil connected to a piezo-electric element 50, as shown.

Because the device is attached to the object to be secured by two separate mechanisms, when the system is enabled (i.e., the housing is affixed to the object and the cable is intertwined through or around the object), defeating one of the attachment means will not separate the housing from the object being protected. As a result, the device, in the alarm condition, will remain attached to the object to be protected. This should further deter a would be thief from taking the protected object once the alarm is sounded.

More specifically, in operation, when the housing is mounted to the object to be secured, SW1 is closed. This causes SW1 to become a component of the conductor cable, which in turn is part of the alarm circuit. When the retainer is inserted into the sleeve, thereby causing contact with wire 22a, SW2 is closed. This completes the power circuit and energizes the device. So long as SW1 and SW2 are closed, the conductor cable is continuous since the retainer is in the sleeve and contact is made with wire 22a. When initially energized, R5 and C1 combine to momentarily energize T3, causing the audible annunciation circuit to be instantaneously powered, causing the piezo electric device to emit an audible "announcement." This initial activation is of short duration and serves to notify the operator that the alarm circuit has been energized. Once energized, R4 and R6 create a voltage at the SCR sufficient to ensure that the SCR will remain off. As long as the SCR is off, the audible annunciator circuit will not be energized and the piezo electric device will not sound. However, once the alarm circuit is energized, if SW2 remains closed (i.e., the device remains energized) and either SW1 becomes open (i.e., the device is removed from the object) or the conductor cable becomes discontinuous (i.e., the cable is cut or forcibly removed from the housing) the voltage at the gate of the SCR increases sufficiently to turn the SCR on. This energizes the audible annunciator circuit. Once the SCR is turned on, by design it can not be turned off (deenergizing the audible annunciator circuit) by either once again closing SW1 or by remaking the conductor cable continuous again. The audible annunciator circuit can only be deenergized by:

a) causing SW2 to become open (i.e., by removing the retainer from the housing sleeve, which requires access to the lock mechanism via the key or combination):

b) removing the battery (which can only be accomplished by accessing the interior of the housing which also requires authorized access to the lock mechanism via the key or combination; or c) a failure of the power source.

Figure 3:
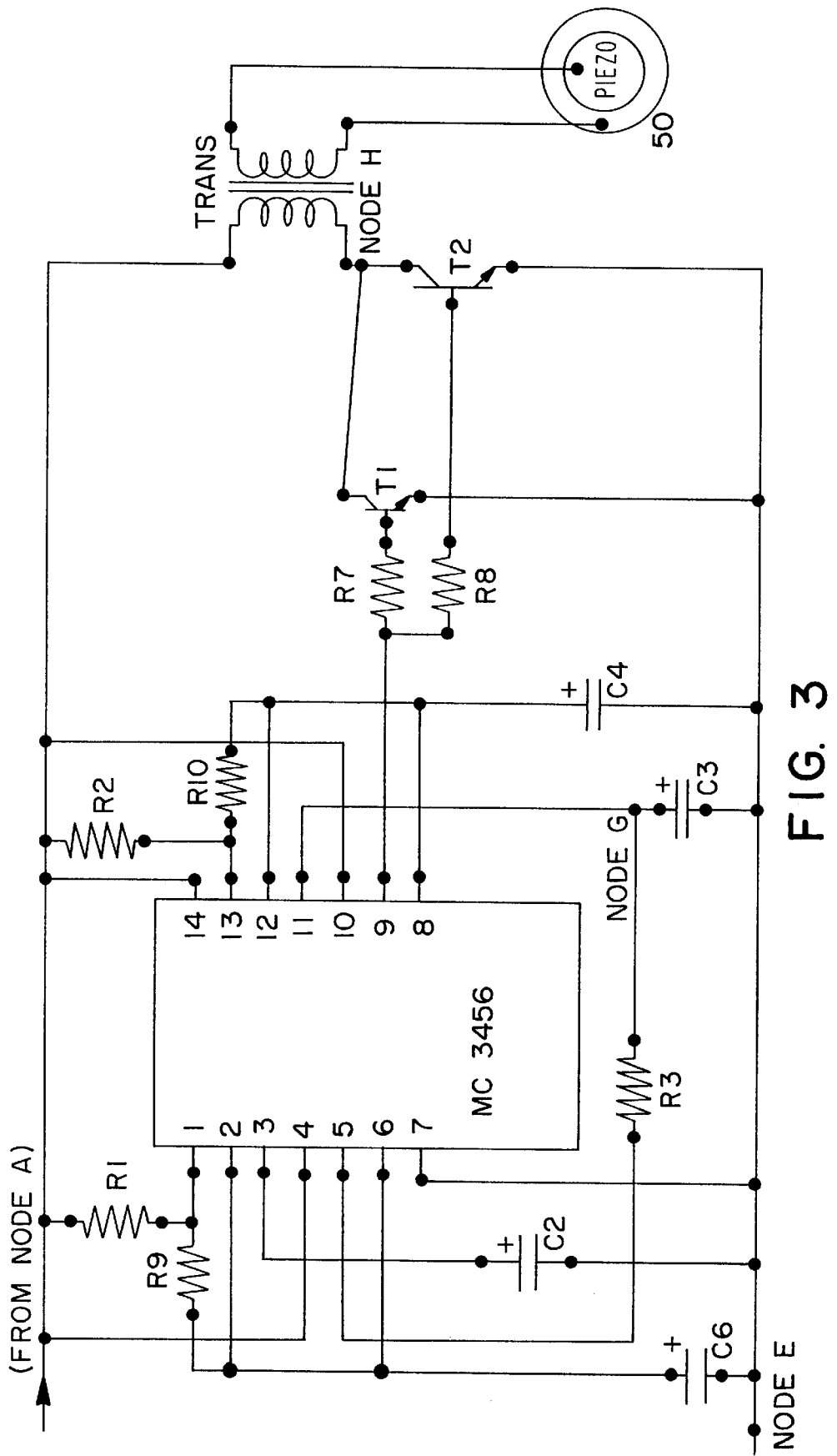
FIG. 3 is a schematic diagram of a preferred embodiment of an audible annunciator circuit according to one embodiment of the present invention.

To intentionally deactivate the alarm, SW2 is returned to its normally open position by removing the retainer from the sleeve, thereby deenergizing the alarm circuit. The audible annunciation circuit shown in FIG. 3 is one of numerous configurations that call be used to carry out the principles of the present invention.

The cable 20 preferably comprises one-eighth inch diameter vinyl coated stainless steel wire rope. The wire rope preferably will be a suitable conductor to complete the alarm circuit. The cable 20 may be located on a spring loaded spool (not shown) located within housing to allow the cable 20 to be retracted into the housing 10 when not in use. Alternatively, the housing 10 may be constructed with a grove or recess designed to receive the cable so that it can be manually coiled around the housing for storage when not in use. A clip or bracket (not shown) may be provided to secure the retainer 23 to the housing after the cable is wrapped therearound.

Preferably, the fixed end of the cable will be permanently attached to the interior of the lock housing. However, other alternatives exist. The lock mechanism 24 is preferably a key activated lock. However, other types of lock mechanism and lock activators can be used.

The attachment mechanism 14 is preferably a strap of similar material and gauge as the housing. A saddle may be integrated into the lock housing to ensure a tight and proper fit of the housing to the frame, and to reduce the possibility that the straps can be severed.

Switch SW1 is preferably a pressure switch and may be positioned in the lock housing, with the plunger protruding out in the saddle area. The plunger will be depressed, and the alarm circuit is complete when the housing 10 is attached to the object to be secured.

The housing faceplate (access door) will be secured to the housing 10, preferably by lock mechanism 24 or by other methods. Access into the housing 10 may be required to attach the housing to the object to be secured, to periodically replace the battery, and for other purposes.

Illumination of an LED or other visual indicator may be used to signify that the alarm circuit is activated. Alternatively, the alarm or other audible indicator may sound intermittently upon activation of the alarm circuit to confirm its activation.

A manual switch, either mounted on the housing 10 or remotely therefrom (e.g. hardwired to the housing 10), may be provided to allow the alarm to be selectively used as a horn. If this option is used, care should be taken to insure that any flaw or interruption in the horn wiring components will not disable the alarm circuit or adversely affect the intended function of the alarm circuit. The alarm circuit may be designed to ensure that the speaker/noise maker cannot be silenced, once the alarm circuit has been activated, without using the key for the locking mechanism to access and disconnect the power source. A reflective safety material can be applied to the exterior of the housing to provide a safety feature, especially if the object to be secured is a bicycle or other object that may be used at night.

The housing 10 may be aluminum, plastic or other light weight material to minimize weight, a concern for bicycle enthusiast. It should be tamper proof however to avoid unauthorized access to the interior of the housing. The housing may be designed to be easily and permanently affixed to the frame of a bicycle or other portion thereof. It may be desirable to include the housing access control mechanism on the alarm circuit, so that the alarm will be initiated if the housing is accessed improperly. Preferably the housing 10 is weather proof and the alarm speaker can be mounted in a suitable position to minimize muffling of the alarm by a potential thief.

A talking circuit may be incorporated into the housing and may be part of a connection with the alarm circuit. For example, an electronic voice may emanate periodically to identify that the lock is an alarm activated circuit that is tamper proof. Other suitable messages may be used. The audible circuit may also be used upon activation of the alarm to audibly notify the user that the alarm is activated. Additionally, the electronic voice may be activated upon the detection of improper tampering to generate a message which says "this bicycle is being stolen, please call the police," or other desired messages.

When the housing is affixed to the bicycle frame, an identification number or other identification code can be applied to the frame (physical imprint, special ink, magnetic strip, etc.). If desired, a photovoltaic cell may be used to power or supplement or recharge the battery. If desired, directional turning signal lights can be incorporated into the housing with external switches integral or remote from the housing. If desired, a transmitter can be incorporated into the housing to enable the bicycle owner to be signaled upon triggering of the alarm. Standard transmitter technology can bemused to implement this feature.

The invention has been described, in some respects, in connection with bicycles. It may also be used with motorcycles, boats, pets, lockers, residential and/or commercial entry, indoor garage doors, gun cabinets and for a host of other applications and objects too numerous to mention. Various modifications will be readily apparent to one of ordinary skill in the art.

While preferred embodiments of this invention have been described, the invention is not so limited. The scope of the invention is only limited by the claims appended hereto.

We claim:

1. A security system for securing an object to a desired structure comprising: an enclosed housing having an interior portion and a lockable access door to permit access to the interior portion;

an attachment mechanism for attaching the housing to the object, at least a portion of the attachment mechanism being located within the housing;

a cable for enabling the object to be secured to the desired structure, the cable having a first end and a second end and a continuous path between the first and second ends, the first end being fixed to the housing and the second end being insertable into the housing to create a conduction path between the first end and the second end within the housing;

a first normally open switch operatively positioned with respect to the housing to be closed when the second end of the cable is inserted into the housing; and an audible indicator operatively connected to the first and second switches and the conduction path to indicate unauthorized tampering with the security system when the first switch is opened while the second switch is closed, and also when the conduction path is compromised while the second switch is closed.

2. The security system of claim 1 further comprising a lock mechanism which is operable in a plurality of states including:

a) a first state in which the access door is unlocked to permit access to the interior of the housing;

b) a second state in which the access door is locked and the second end of the cable may be inserted into and removed from the housing; and c) a third state in which the second end of the cable is locked in position within the housing.

3. The security system of claim 1 further comprising an alarm circuit comprising the first and second switches, the cable and the audible indicator, wherein the alarm circuit is armed upon closure of the first and second switches, and after the first and second switches are closed, an unauthorized tampering of the security system will cause the audible indicator to emit an audible signal.

* * * * *